INVENTOR.
MARIO DIGIOVANNI
BY Philip Subkow
ATTORNEY

Aug. 9, 1960   M. DI GIOVANNI   2,948,873
STRAIN WIRE TRANSDUCER
Filed Feb. 24, 1958   6 Sheets-Sheet 2

INVENTOR.
MARIO DiGIOVANNI
BY Philip Subkins
ATTORNEY

Aug. 9, 1960   M. DI GIOVANNI   2,948,873
STRAIN WIRE TRANSDUCER

Filed Feb. 24, 1958   6 Sheets-Sheet 3

INVENTOR.
MARIO DiGIOVANNI
BY
ATTORNEY

Aug. 9, 1960   M. DI GIOVANNI   2,948,873
STRAIN WIRE TRANSDUCER
Filed Feb. 24, 1958   6 Sheets-Sheet 4

INVENTOR.
MARIO DiGIOVANNI
BY Philip Subkow
ATTORNEY

INVENTOR.
MARIO DiGIOVANNI
BY
ATTORNEY

Aug. 9, 1960         M. DI GIOVANNI         2,948,873
STRAIN WIRE TRANSDUCER

Filed Feb. 24, 1958         6 Sheets-Sheet 6

INVENTOR.
MARIO DI GIOVANNI
BY
ATTORNEY

United States Patent Office 2,948,873
Patented Aug. 9, 1960

2,948,873

STRAIN WIRE TRANSDUCER

Mario Di Giovanni, Pacific Palisades, Calif., assignor to Statham Instruments, Inc., Los Angeles, Calif., a corporation of California Filed Feb. 24, 1958, Ser. No. 717,139

8 Claims. (Cl. 338—4)

This invention relates to an improvement in the so-called zero gage length transducers of the unbonded strain wire type disclosed in Louis D. Statham, U.S. Patent No. 2,760,037; 2,760,038; 2,760,039 and 2,760,-040. In these patents an unbonded strain wire transducer is described in which strain sensitive wires are stretched between a wire support which is yieldably mounted and a second wire support which is moved as a result of some force imposed on, or some displacement of, a motion-transmitting connection termed a force summing means. Another wire is stretched between the first wire support and a third wire support. The third support is so mounted that when the second wire support is displaced, a relative motion occurs between the second and third support. In such transducers, the displacement of the second and third wire supports relative to each other results in an increase in tension in one of the wires called an "arm" and a decrease in tension in the other wire or arm.

Because the change in tension is opposite in the two arms, they are termed "oppositely tensioned arms." They are called arms since the change in resistance in the wires may be measured by making these wires arms of a Wheatstone bridge.

The wires between the second wire support and the first and third wire supports may be of the same length and the linear separation of the pins with respect to the yieldably supported pin may be zero, and thus the gage length of the transducer may be substantially zero. Such transducers have been termed "zero gage length" gages or transducers and will be so named in this specification.

Experience with such gages, particularly such gages in which a substantial mass is carried by the spring support, shows that under certain conditions of vibration or acceleration of the gages, frequency and acceleration effects occur which cause the wires to rupture, whether or not the gage is being loaded, i.e., even in the absence of any displacement of the pin support connected to the force summing means.

It is an object of my invention to devise a zero gage length transducer which will withstand to a large degree the disruptive forces due to vibration of the instrument or due to acceleration effects.

It is a further object of my invention to kinematically balance the yieldably mounted wire support in a zero gage length unbonded strain wire transducer by mounting the support upon which the wire is positioned on the yieldable mount in such manner that substantially balanced opposing inertial forces are imposed on the yieldable support.

The yieldable support for the strain wires, which is herein called an armature, is connected to a member having the required compliance in relation to that of the strain wires. That is, the spring rate, i.e., the spring constant of the wires bears the required relation to that of the yieldable support as set forth in the aforementioned Statham patents. Thus, for example, the spring rate of the wires is a multiple of the spring rate of the yieldable support, preferably in the order of 100 to 1000 times the spring rate of the flexure.

In the improvement of my invention I mount the armature for angular deflection about a hinge point, so that the armature is balanced about the hinge point. The armature deflects against the constraint of the compliance. Because the system is substantially balanced about the hinge, the inertia forces imposed on vibration or acceleration of the system substantially cancel and any disruptive movement of the armature is not obtained.

In a preferred embodiment I combine the hinge and compliance and mount the armature on a flexure which permits the armature to deflect angularly on the flexure when the armature is unequally loaded on both sides of the flexure. On removal of the load the flexure restores the armature to its initial position.

In a preferred embodiment of my invention, the yieldable support for the wire mounting or armature is in the form of a balanced beam, fulcrumed or pivoted at its center of mass about which the beam is substantially balanced. The wire supports are mounted on the beam at one side of the center of rotation at the fulcrum or pivot. The beam is substantially rigid so that no substantial bending or deflection occurs in the beam either on vibration of the instrument or upon the motion of the force summing means. As previously stated the fulcrum and the yieldable constraint may be combined by combining the beam with a flexure so positioned that the beam may pivot as described herein.

Another modification of my invention includes the balancing of the system by employing a second pair of oppositely tensioned arms, one of which is connected to the force summing means and to a wire support on the beam at the opposite side of the center of rotation and the other arm of the second pair is connected to a wire support mounted on the beam adjacent to the last named wire support and to a wire support on the frame as in a manner similar to the previously described arm.

These and other objects of my invention will be understood by reference to the drawings, of which:

Fig. 13 is a perspective view of Fig. 12.

Figure 1:
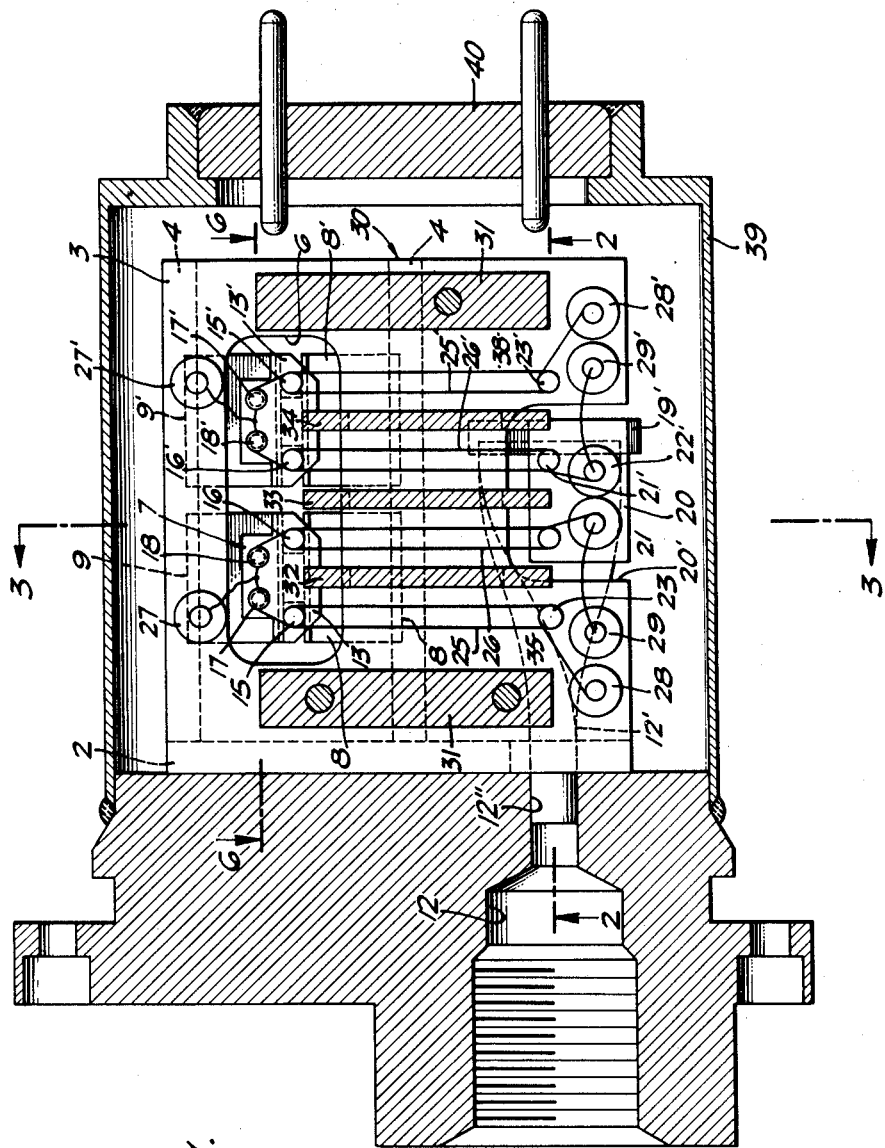
Fig. 1 is a vertical section through an instrument according to my invention.

Mounted in the base 1 is a frame member composed of a bracket 2 carrying a web 3 on which is mounted a bracket 4. The base 5 of the bracket 4 is formed with a rectangular hole 6. The beam 7 is mounted on two flexible angles 8 and 9 formed of flexible thin sheet metal formed into angular forms, the long side of the angles 8 and 9 being attached to the base 5 of the bracket 4, the short arms of the angles are attached to the top and bottom of the beam at 10 so that the beam is mounted for deflection about an axis of rotation passing through 10.

The armature 13 is mounted at one end of the beam and the armature 14 is mounted at the opposite end of the beam in symmetrical configuration about the longitudinal axis of the beam. A similar beam 7' similarly mounted and carrying similarly oriented armatures 13' and 14' is positioned adjacent to the first mentioned beam 7 and armatures 13 and 14, all parts of said adjacent beam, armature and mounting therefor are shown with prime numbers, each prime number corresponding exactly in configuration and construction to the like element with the unprimed numbers previously described.

The beams 7 or 7' and the armatures 13 and 14 and 13' and 14' each form an armature assembly which is fulcrumed on the flexure composed of the springs 8 and 9 and 8' and 9' mounted on beams 7 and 7' intermediate their ends. The flexures are positioned at substantially the center of mass of the armature assemblies. The armature assembly is thus weight balanced about the center of rotation 10.

The base 1 carries a bore 12, to which is connected a flattened Bourdon tube 12' twisted through a 90° twist. One end of the Bourdon tube is positioned in the slot 12". The other end of the tube is positioned in a counter-bore 19" in the boss 19' of the bracket 19 which carries the armature 20. The bracket 19 thus acts as the force summing means which transmits the motion of the Bourdon tube to the armature 20. The armature 20 is positioned in the notch 20' in the web 3 of the bracket 2 so that the face of the armature, the bracket and the armatures 13 and 13' are all coplanar.

Insulated pins 15 and 16 such as sapphire pins are positioned in armature 13. Like pins 15' and 16' are positioned in armature 13'. The pins in each armature are spaced, one on each side of the axis of the beams 7 and 7', the axis of all the pins 15, 16, 16' and 15' being aligned on a line. Pins 15, 16, 15' and 16' are termed herein first wire supports. Pins 23 and 23' are mounted in the web 3 and pins 21 and 21' are mounted in the armature 20 so that pins 15 and 23; 16 and 21, 16' and 21' and 15' and 23' are all aligned with their axis on parallel lines. The axis of the pins 23, 21, 21' and 23' are also aligned on the line parallel to the line connecting the axis of the pins 15, 16, 16' and 15'. Pins 21 and 21' are termed herein second wire supports, and pins 23 and 23' third wire supports.

Terminal pins 17 and 18 are mounted in the armature 13 and terminal pins 18' and 17' are mounted in the armature 13' and terminal pins 22 and 22' are mounted in the armature 20. Mounted on the armatures 14 and 14' are complementary pins 15a, 16a, 16'a and 15'a, and also terminal pins 17a, 18a, 17'a and 18'a to complete the symmetry of construction and weight balance of the beams and armatures supported on the beams. The center of mass is located as close to the center of rotation of the beams 7 and 7' as is practical.

Multiple turn loops of wires are wound between pins 15 and 23, 16 and 21, 16' and 21', 15' and 23', all of said loops being alike in length and number of turns to form like and parallel loops 25, 26, 26' and 25'. The ends of the continuous loop 25 are connected to terminals 17 and 28. Loop 26 is connected at its ends to terminals 18 and 22. Loop 26' is connected at its ends to terminals 17' and 28'. The terminals 17 and 18 are connected at terminal 27. The terminals 17' and 18' are connected at terminal 27'. The terminal 22 is connected to terminal 29 and the terminal 22' is connected with terminal 29'. Terminals 28, 29, 29' and 27 and 27' may be connected into a Wheatstone bridge arrangement.

The wires are covered by a baffle 30 having a base and side arms 31 to which the bracket can be connected by the web 3. The base carries flanges 32, 33 and 34 which extend along the wire loops being positioned within the chambers 35, 36, 37 and 38. The entire instrument is covered by a case 39 in which a terminal connector 40 may be positioned for connection to the terminals 28, 29, 28', 29', 27 and 27'.

Figure 3:
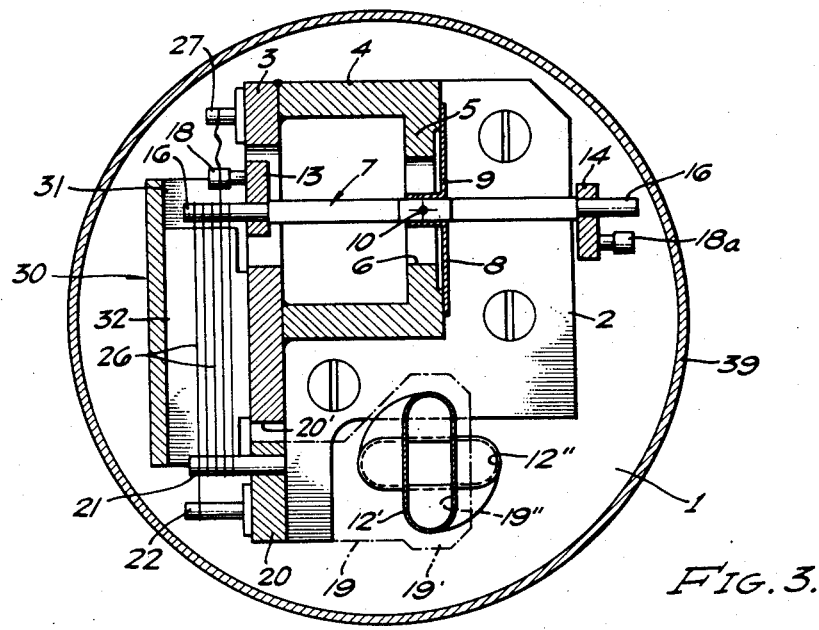
Fig. 3 is a section on line 3—3 of Fig. 1.
Figure 6:
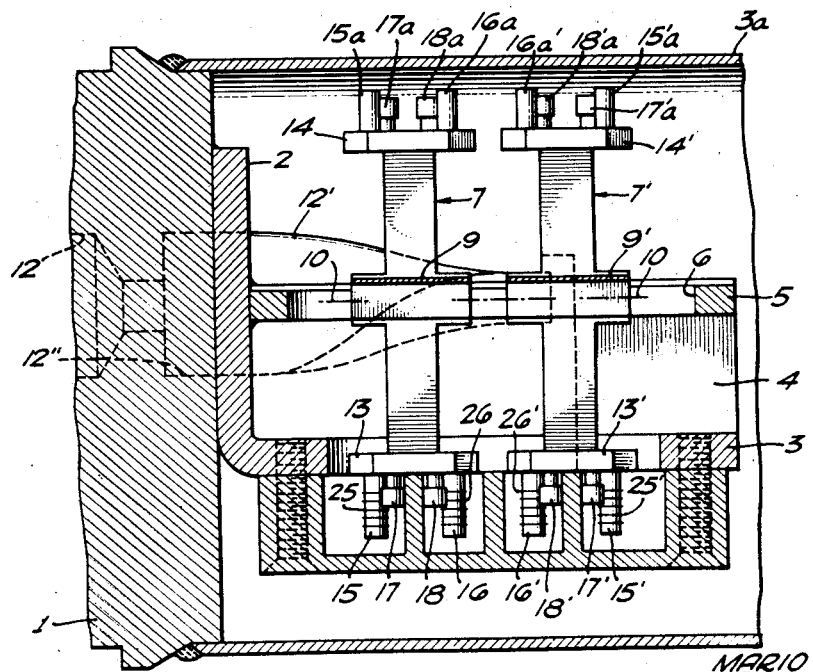
Fig. 6 is a section on line 6—6 of Fig. 1.

On exertion of pressure through the bore 12 the Bourdon tube tends to unwind causing the armature 20 to be deflected so that pins 21 and 21' approach or depart from the pins 16 and 16'. The Wheatstone bridge is thus unbalanced and the degree of unbalance is proportional to the pressure exerted in 12. It will be observed that upon vibration of the instrument or upon linear acceleration in the plane of Figs. 1 and 3 that the inertial forces are balanced about the axis 10 and no substantial deflection of the beams 7 or 7' will occur. Consequently the amplitude of vibration of both ends of the beams will not exceed the safe limit to cause a rupture of the wires or other destruction of the gage on such motion.

Figure 7:
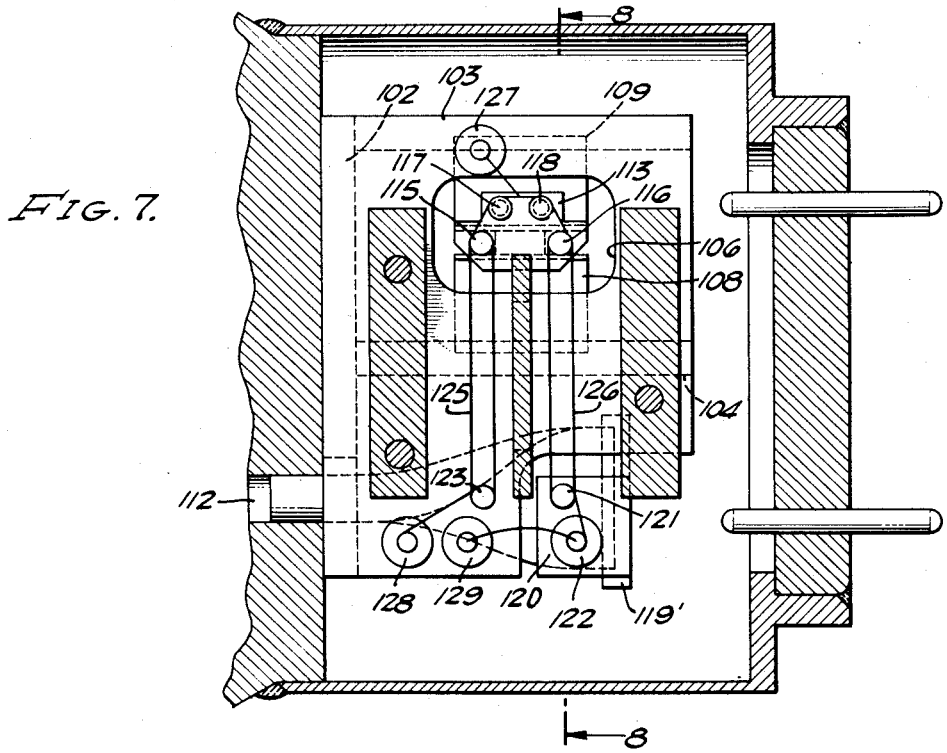
Fig. 7 is a modification of the structure of Figs. 1–5.
Figure 8:
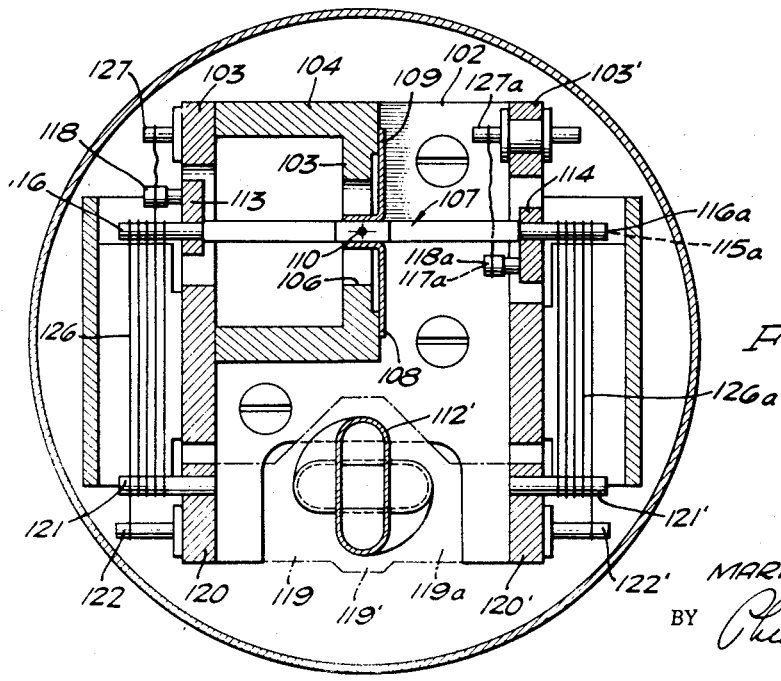
Fig. 8 is a section on line 8—8 of Fig. 7.
Figure 9:
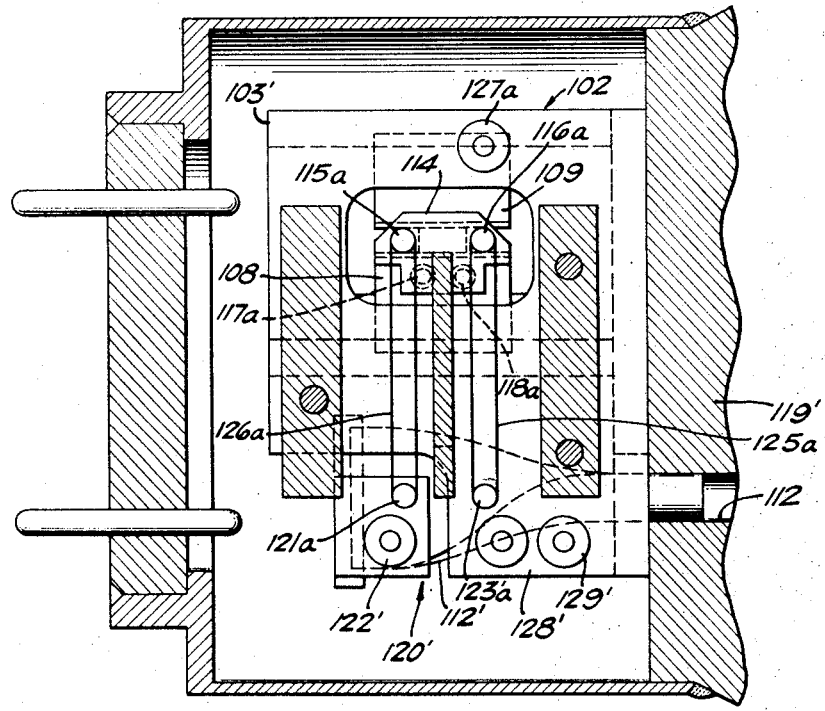
Fig. 9 is a rear view of the structure shown in Fig. 7.

The modification shown in Figs. 7-8 is a further improvement in the construction shown in Figs. 1-6 in that the structure is further balanced symmetrically. This is done by connecting the pins in each end of the beam 7 to the force summing means so that both ends of the beams are constrained by strain wire supports. Thus it is possible to obtain a four active arm bridge employing only one beam.

Referring to Figs. 7 and 8, it will be observed that the bracket 102 carries an additional web 103' parallel to web 103. The bracket 119 and armature 120 has been duplicated by means of the exterior bracket 119a and the armature 120'. The Bourdon tube is mounted in slot 112 in the base and in the boss 119'.

The armature 120 carries only one pin 121 and the terminal 122. The armature 120' carries a like pin 121' and terminal pin 122'. The beam 107 is mounted on springs 108 and 109 mounted on the bracket 104, in the hole 106, with the bracket mounted on web 103. This construction is similar to that described in connection with the form of Figs. 1-6.

The armature 113 like armature 13 of the form of Figs. 1-6 carries like pins 115, 116 and terminals 117 and 118 in similar configuration to the pins and terminals of the armature 13. The balancing armature 114 corresponding to armature 14 carries the pins 115a and 116a corresponding to pins 15a and 16a. The terminals 117a and 118a corresponding to 17a and 18a are however mounted on the back of the armature 114. Terminal 127a is mounted in the web 103. The loops 125 and 126 and the pins 115, 116, 121 and 123 are arranged and wound similarly to the loops and pins 15, 16, 21 and 23, and 25 and 26. The pins 115a, 116a, 121a and 123a are arranged in the same patterns as 115, 116, 121 and 123 and loops 125a and 126a are wound on the pins and connected to terminals 128a, 129a, 122a, 127a similarly to loops 125 and 126. Pins 115, 116 are first wire supports, pin 121 is a second wire support, pin 123 is a third wire support, pins 115a and 116a are fourth wire supports, pin 121a is a fifth wire support, and pin 123a is a sixth wire support.

It will be seen that upon the exertion of pressure in bore 112 the Bourdon tube 112' causes a rotation of the bracket 119 to cause the armatures 120 and 120a to move in opposite directions causing an opposite motion of the pins 122 and 122a and an opposite change in tension in the wire loops 126 and 126a and a complementary and opposed change in the tension in the loops 125 and 125a.

It will also be observed that upon vibratory motion in the plane of Fig. 8 the balanced inertial forces about the center of rotation of beam 7 at the hinge area 107 prevent any substantial deflection in either end of the beam 107.

For most purposes and for other than excessive vibratory forces and acceleration forces acting as described above, ordinary good machining tolerances will be adequate to produce a substantially balanced structure. However, since it is practically impossible even with the finest machining skill to exactly balance the structure, it will be found that some departure from exact balance will be found in structures constructed according to my invention. The degree of departure will vary as between various units within the limits of the machining tolerances obtainable.

I have found that these deviations may be compensated and their inertial effects reduced to negligible proportions by damping the moving parts of the structure. The degree of damping which is obtained is such as to prevent the excessive excursions of the spring supported armatures due to vibratory or acceleration forces along any of the sensitive axis. This is accomplished by filling the chamber 1 with oil or other electrically non-conductive liquid of the proper viscosity, for example, the oils referred to in the above Statham Patent No. 2,760,037.

Another advantage of the damping is that it will reduce the deflection of the wires resulting from the acceleration or vibration effects on the armatures 20, 20', 120 and 120'. In like manner it will damp the vibrations of the wires 25, 26, 25', 26' and 125, 126 and 125' and 126'.

Figure 2:
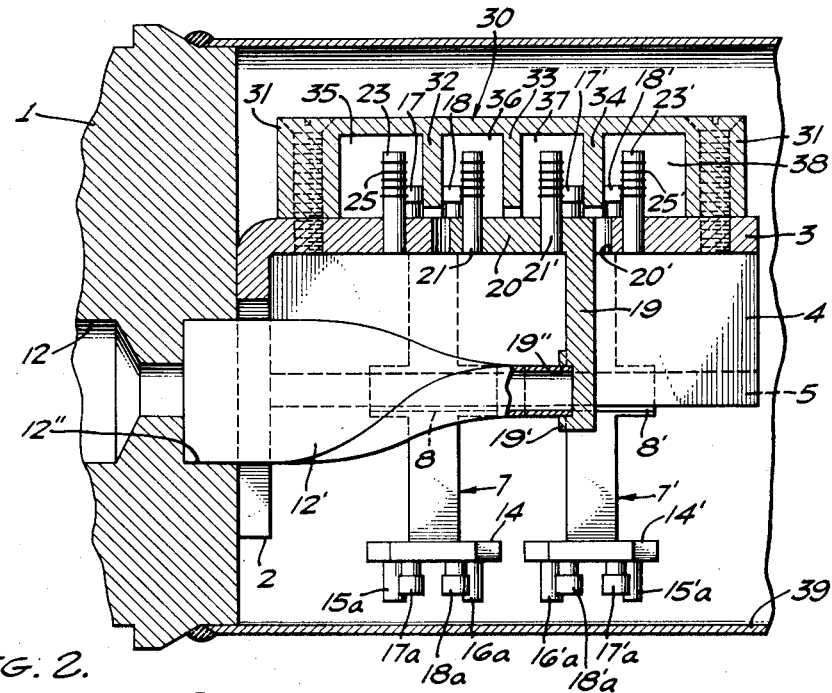
Fig. 2 is a section on line 2—2 of Fig. 1.
Figure 5:
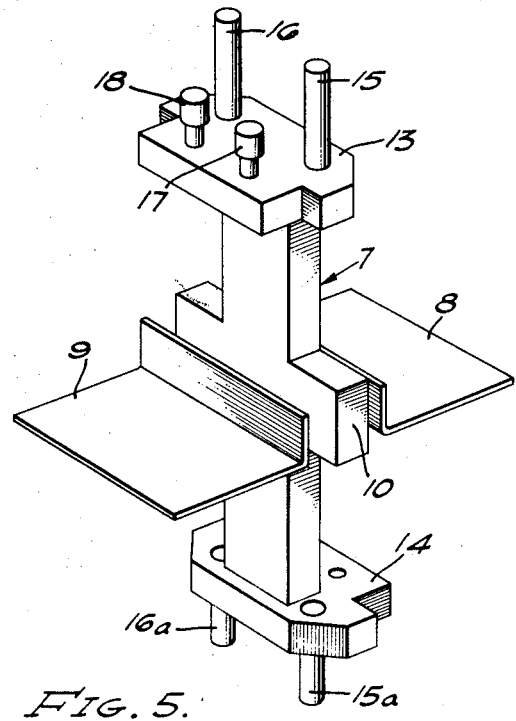
Fig. 5 is an exploded view of one of the beam mountings.
Figure 4:
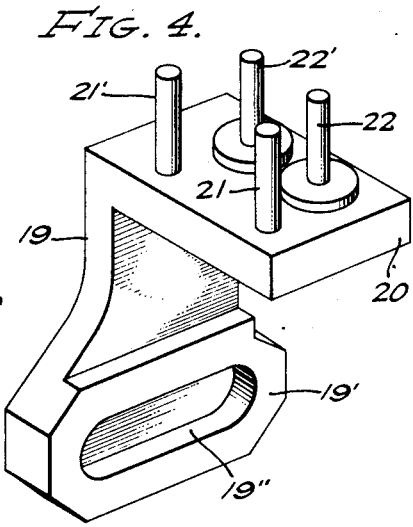
Fig. 4 is a perspective of one of the parts shown in Figs. 1–3.

For twisted Bourdon tube of substantial rigidity against deflection in bending along any line perpendicular to the axis of the Bourdon tube, it will be found that the asymmetric configuration of the armature 20 of Fig. 2 will cause no substantial deflection of the tube where the instrument is accelerated linearly or vibrated along a line parallel to the axis of the Bourdon tube 12'. However, when the range of pressure to be sensed is low, and the tube 12' is relatively limber, such acceleration may cause a deflection of the tube and a rocking of the armature 20. This will produce an output from the bridge in which the strain wires are placed. This movement even for limber Bourdon tubes is limited and made negligible in the form shown in Figs. 7 and 8 in which the armature 120 is balanced by the armature 120' (see Fig. 8). In this form accelerated motion or vibration movement in a direction parallel to the axis of 112' will affect both 120 and 120' in substantially the same amount and direction. Thus the bridge in which the wires 125, 126, 125a and 126a are placed will show no output.

Figure 10:
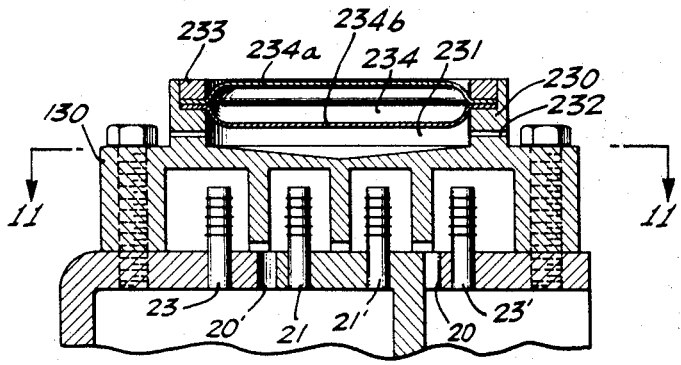
Fig. 10 is a vertical section similar to Fig. 2 of a modified form of baffle having an air capsule thereon.
Figure 11:
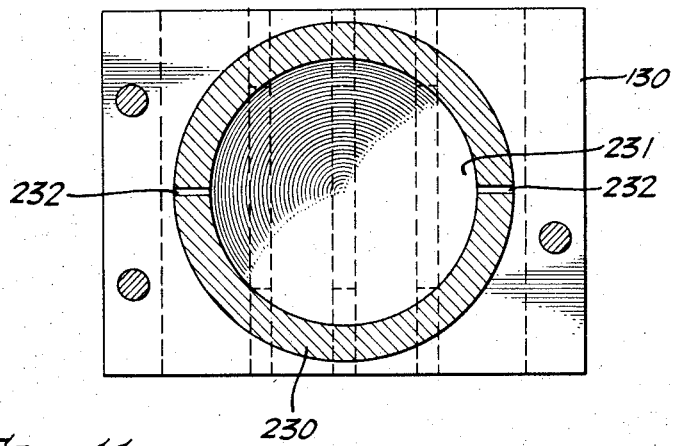
Fig. 11 is a horizontal section on line 11—11 of Fig. 10.
Figure 12:
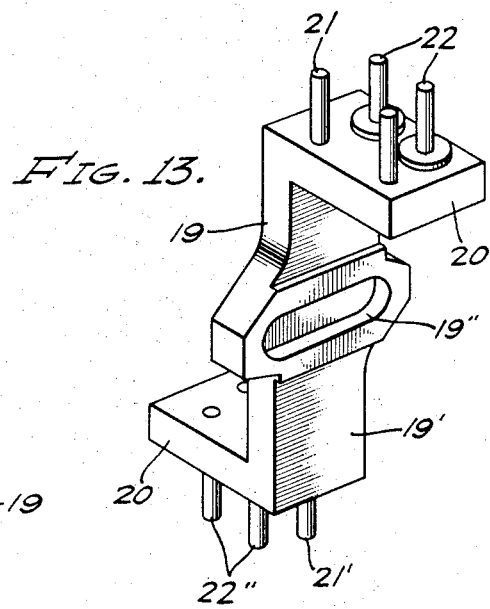
Fig. 12 is a vertical section of a modified form of armature having a balancing arm.
Figure 12:
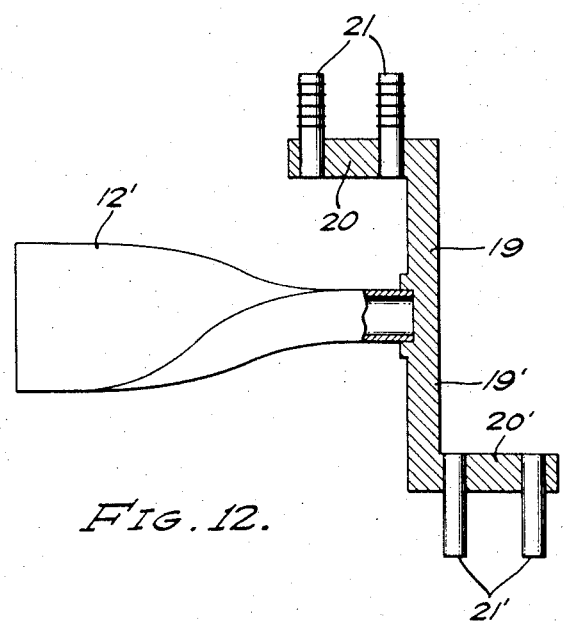

A similar and kinematically more ideal arrangement is shown by Figs. 10 and 11 which show a modification of the armature 20 by providing an extension 19' and 20' which carries blind pins and terminals 21' and 22'', with the armature 20' extending oppositely to 20 to produce a kinematically balanced armature structure.

When the chamber 1 is filled with liquid for damping purposes, it is desirable to provide room for the liquid to expand when the temperature is elevated. This may be accomplished by employing a conventional expansion chamber. A particularly useful expansion device is shown in Fig. 10 in which the baffle 30 of Fig. 2 is modified. The baffle is shown as 130 in Fig. 10 and carries a square flange 230 carrying bores 232. The chamber 231 formed by the flange walls 230 is covered by an air-tight capsule 234 formed of two mating dished members 234a and 234b held in position on the flange by the retaining member 233. The liquid which fills the chamber 1 fills the chamber 231 and any expansion of the liquid compresses the capsule 234.

While I have described particular embodiments of my invention for the purposes of illustration, it should be understood that various modifications and adaptions thereof may be made within the spirit of the invention as set forth in the appended claims.

I claim:
1. An unbonded strain wire transducer comprising a force summing means, a frame, an armature assembly, a flexure positioned on said armature assembly intermediate the ends of said armature assembly, a wire support on said armature assembly at one side of said flexure, a second wire support mounted on said force summing means and a third wire support mounted on said frame adjacent the said second wire support, a strain wire extending in tension from the third to the first wire supports and from the first to the second wire support.

2. In the transducer of claim 1, said flexure being mounted at substantially the centers of gravity of the armature assembly.

3. In the transducer of claim 1, said armature assembly comprising a beam, a wire support mounted on said beam at one side of the said flexure.

4. In the transducer of claim 3, a fourth wire support mounted on said beam at the other side of said flexure, a fifth wire support mounted on said force summing means and a sixth wire support mounted on said frame adjacent the fifth wire support, strain wires extending in tension between the sixth wire support and the fourth wire support and between the fourth wire support and the fifth wire support.

5. An unbonded strain wire transducer which comprises a force summing means, a frame, an armature assembly hingedly and yieldably mounted on said frame intermediate the ends of said armature assembly, a wire support on said armature assembly at one side of said hinge, a second wire support mounted on said force summing means and a third wire support mounted on said frame adjacent said second wire support, a strain wire extending in tension from the third to the first wire support and from the first to the second wire support.

6. In the transducer of claim 5, said hinge being mounted at substantially the center of gravity of the armature assembly.

7. In the transducer of claim 6, said armature assembly comprising a beam, a wire support mounted on said beam at one side of said hinge.

8. In the transducer of claim 7, a fourth wire support mounted on said beam at the other side of said hinge, a fifth wire support mounted on said force summing means, a sixth wire support mounted on said frame adjacent the fifth wire support, strain wires extending in tension between the sixth wire support and the fourth wire support and between the fourth wire support and the fifth wire support.

References Cited in the file of this patent
UNITED STATES PATENTS
2,573,286    Statham et al. _____ Oct. 30, 1951